(12) United States Patent
Esposito et al.

(10) Patent No.: US 7,458,648 B2
(45) Date of Patent: Dec. 2, 2008

(54) VEHICLE WHEEL WITH EASILY ACCESSIBLE INFLATION VALVE

(75) Inventors: Alessandro Esposito, Bergamo (IT); Luciano Colleoni, Bonate Sotto (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 10/552,162

(22) PCT Filed: Apr. 18, 2003

(86) PCT No.: PCT/IT03/00249

§ 371 (c)(1),
(2), (4) Date: Jul. 19, 2006

(87) PCT Pub. No.: WO2004/091934

PCT Pub. Date: Oct. 28, 2004

(65) Prior Publication Data

US 2007/0163695 A1    Jul. 19, 2007

(51) Int. Cl.
*B60C 29/02* (2006.01)
(52) U.S. Cl. .................. 301/65; 301/104; 152/427
(58) Field of Classification Search ........... 152/415, 152/416, 417, 418, 427, 428; 301/64.101, 301/64.102, 65, 104, 67, 73, 79
See application file for complete search history.

(56) References Cited

U.S. PATENT DOCUMENTS

| | | | | |
|---|---|---|---|---|
| 1,777,671 A * | 10/1930 | Hinman et al. | ................ | 301/65 |
| 1,947,911 A * | 2/1934 | Kay | ............................. | 301/65 |
| 2,544,387 A * | 3/1951 | Kerr | ............................. | 301/65 |
| 3,779,611 A * | 12/1973 | Phillippe | ...................... | 301/65 |
| 4,106,543 A | 8/1978 | Sano | | |
| 5,221,381 A * | 6/1993 | Hurrell, II | ................... | 152/416 |
| 5,641,208 A * | 6/1997 | Stach | ..................... | 301/64.102 |
| 6,428,114 B1 * | 8/2002 | Sebode | .................. | 301/64.705 |
| 6,955,201 B2 * | 10/2005 | Ruetter et al. | ............... | 152/417 |
| 2007/0187015 A1 * | 8/2007 | Alff | .......................... | 152/418 |

FOREIGN PATENT DOCUMENTS

| | | | |
|---|---|---|---|
| DE | 3631712 | * | 3/1988 |
| DE | 89 05 057 U | | 7/1989 |
| EP | 0 228 670 A | | 7/1987 |

OTHER PUBLICATIONS

Patent Abstracts of Japan, vol. 004, No. 072 (M-013), May 27, 1980 & JP 55 036113 A.
International Search Report Dated Jan. 16, 2004 for International Application No. PCT/IT2003/000249.

* cited by examiner

*Primary Examiner*—Russell D Stormer
(74) *Attorney, Agent, or Firm*—Hogan & Hartson LLP

(57) ABSTRACT

A vehicle wheel (4) comprises a hub (8), a rim (32), and at least one connecting spoke (52) between the hub (8) and the rim (32). The at least one spoke (52) comprises, in the region of a rim-attachment portion (60), a first duct (68) which is arranged substantially radially and a second duct (72) which is arranged substantially axially and is in communication with the first duct (68). The second duct (72) constitutes a seat for an inflatation valve (94) that can be associated with the wheel (4). The inflatation valve (94) is easily accessible for operations to inflate a tyre (44) mounted on the rim (32).

23 Claims, 6 Drawing Sheets

VEHICLE WHEEL WITH EASILY
ACCESSIBLE INFLATION VALVE

FIELD OF THE INVENTION

The present invention relates to a wheel for vehicles; in particular, the present invention relates to wheels suitable for use on motorcycles.

BACKGROUND OF THE INVENTION

As is known, in motorcycles, the front wheels often comprise two brake discs which are mounted symmetrically on opposite sides of a central plane of the wheel and astride which associated disc-brake calipers are mounted. The radial dimensions of each brake-disc and brake-caliper assembly constitute an obstacle which hinders access to the tire-inflation valve which projects radially from the rim towards the hub of the wheel.

Access to the valve is also difficult in the rear wheels since, on one side of the wheel, there is usually the transmission unit comprising a chain wheel coaxial with the wheel and a chain associated therewith, together with a casing system and, on the other side, there is the brake disc; moreover, on both sides, there are the side members of the fork which supports the rear wheel.

The tire-inflation operation is therefore slow and complex and often forces the operator to use both hands. In fact it is necessary to grip the air-supply hose with one hand and to hold the pressure-gauge nozzle in position on the inflation valve with the other hand because the air-supply hose has to extend around a right angle so that the nozzle tends to become misaligned relative to the valve, causing leakages of fluid.

These problems are further aggravated in high-performance motorcycles having large-diameter brake discs which form a veritable labyrinth for access to the valve.

To overcome these problems, it is known to provide a wheel comprising two annular ducts, one in the region of the wheel hub and the other in the region of the periphery of the wheel, the annular ducts being in fluid communication with one another by means of at least one internally hollow spoke.

An example of this solution is disclosed in U.S. Pat. No. 5,641,208. However, this solution requires complex and expensive processes for the manufacture of the spokes and limits the possibilities for the implementation of complex geometries for the spokes.

Moreover, a solution of this type is impracticable for motorcycle wheels because the wheels would be positioned asymmetrically with respect to a plane of symmetry of the front wheel-and-axle set, which would be dynamically unbalanced; furthermore, the arrangement of the brakes would be extremely difficult.

The object of the present invention is to provide a wheel for vehicles which solves the problems mentioned with reference to the prior art.

SUMMARY OF THE INVENTION

These problems and limitations are overcome by a wheel for vehicles according to claim 1.

Further embodiments of the wheel according to the invention are described in the subsequent claims.

BRIEF DESCRIPTION OF THE DRAWINGS

Further characteristics and the advantages of the present invention will become clearer from the following description of a preferred and non-limiting embodiment thereof, in which:

FIG. 4A shows a detail of FIG. 4 on an enlarged scale.

DETAILED DESCRIPTION OF THE INVENTION

Figure 1:
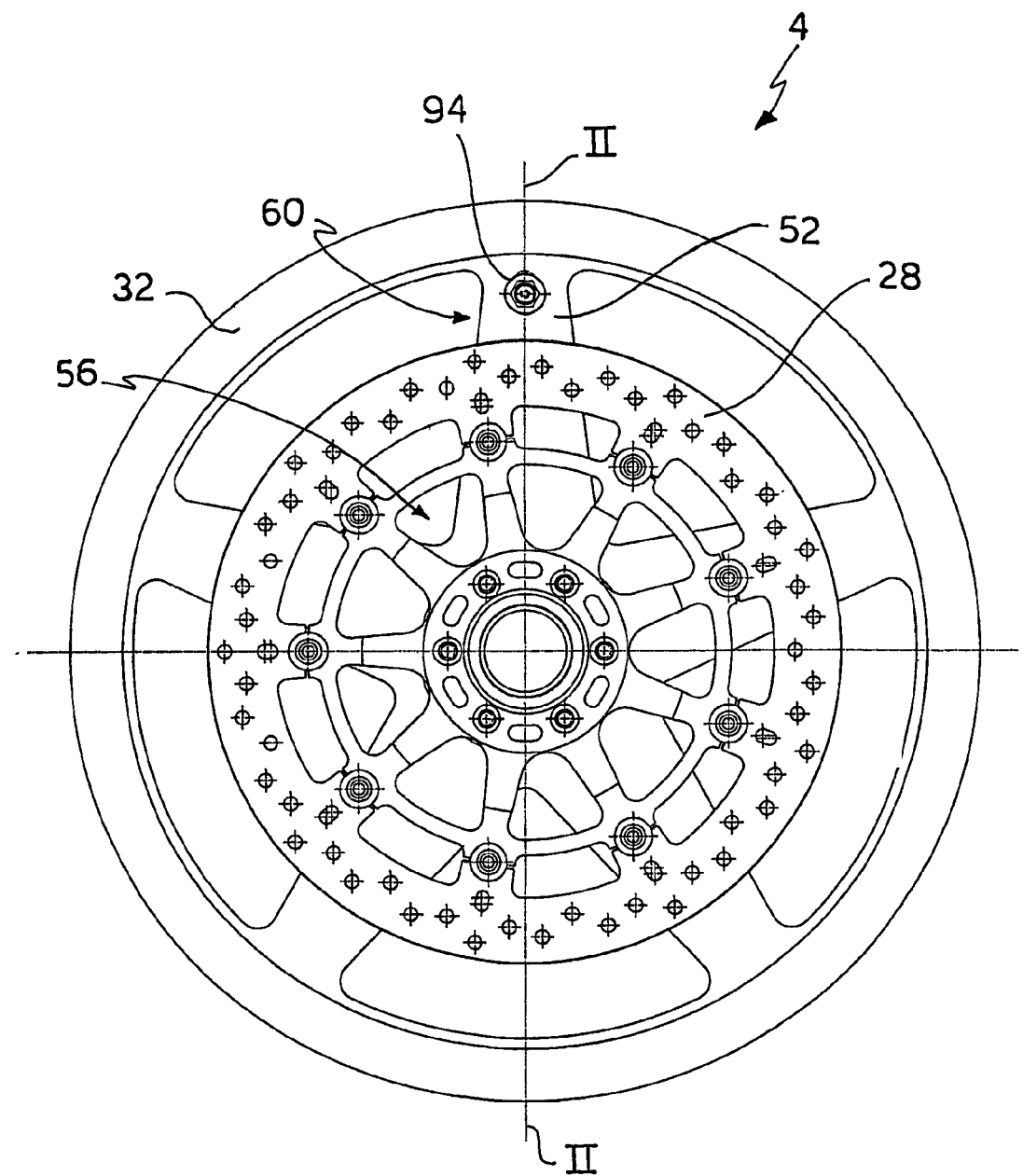
FIG. 1 is a side view of a wheel according to the invention.

Elements or parts of elements that are common to the embodiments described below are indicated by the same reference numerals.

The term "radial direction" is intended to define herein a direction substantially perpendicular to the axis of rotation of the wheel.

The term "axial direction" is intended to define herein a direction substantially parallel to the axis of rotation of the wheel.

The term "tangential direction" is intended to define herein a direction substantially perpendicular to the axial direction and to the radial direction.

With reference to the above-mentioned drawings, a vehicle wheel unit is generally indicated 4.

Figure 2:
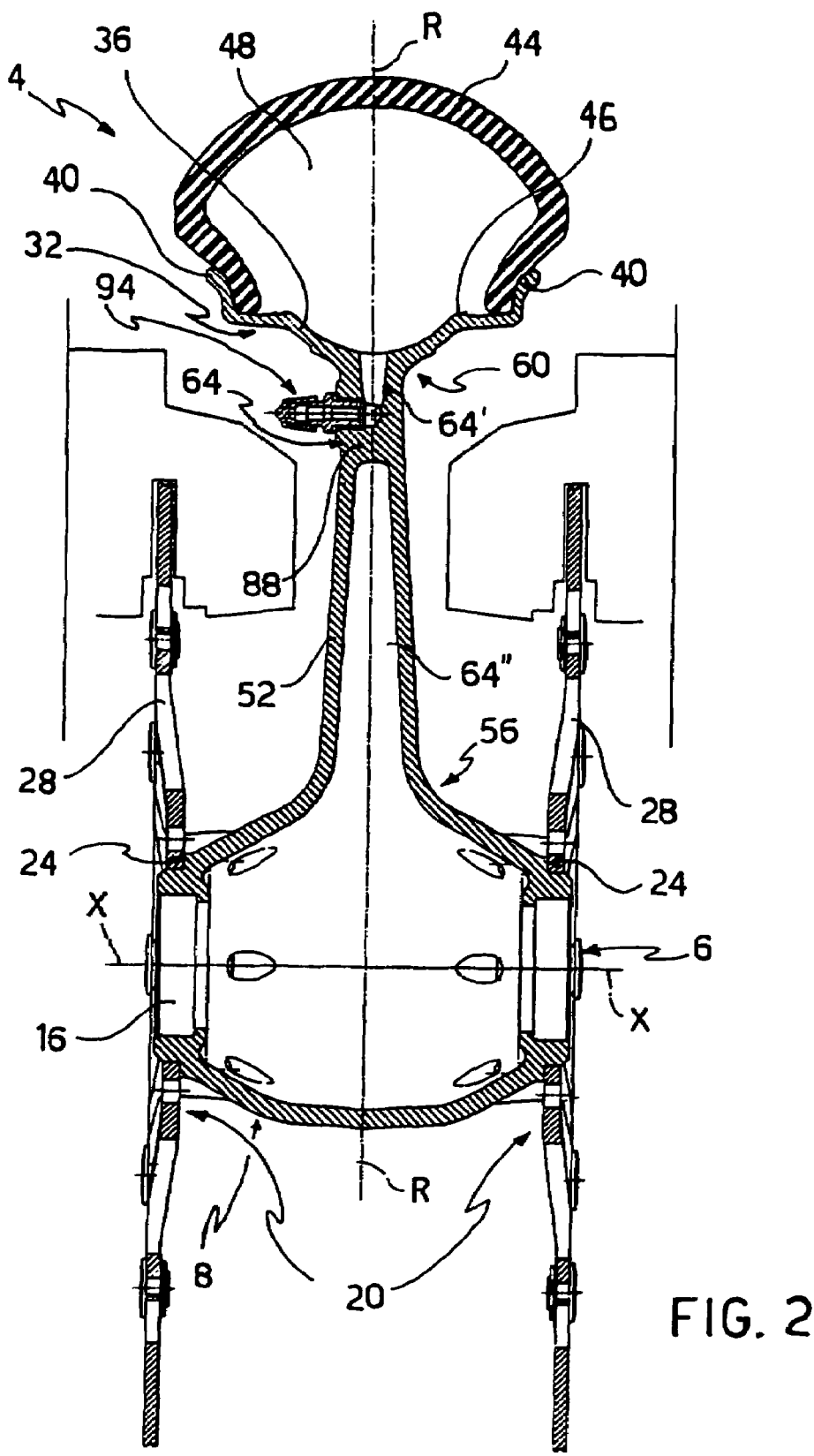
FIG. 2 is a section through the wheel of FIG. 1, taken on the line II-II of FIG. 1.

The wheel 4, as shown in FIG. 2, has a central plane R which substantially divides the wheel 4 into two half-portions; in a configuration in which the wheel 4 is mounted on a respective axle 6 that defines an axis of rotation X of the wheel 4, these two half-portions are arranged symmetrically on opposite sides of the central plane R. In other words, the central plane R is arranged perpendicularly relative to the axis of rotation X and to the axle 6 and divides the wheel 4 into two half-portions having substantially the same axial dimensions.

The wheel 4 comprises a hub 8 suitable for being mounted rotatably on the axle 6 of the wheel 4.

According to one embodiment, the hub 8 has a substantially barrel-like configuration with a hollow cross-section and is arranged symmetrically on opposite sides of the central plane R. The hub 8 comprises a hole 16 which is arranged axially and is suitable for housing support means, for example, rolling bearings, for the axle 6 of the wheel 4.

At opposite axial ends 20 of the hub 8, the hub 8 comprises annular seats 24 suitable for constituting bearing, locating and fixing surfaces for brake discs 28 mounted coaxially relative to the hub 8 and parallel to the central plane R of the wheel.

The wheel 4 further comprises an annular rim 32 coaxial with the hub 8 and arranged symmetrically relative to the central plane R of the wheel.

The rim 32 comprises a channel 36 having, on axially opposite sides, two rim flanges 40 which extend substantially radially around the entire circumference of the channel 36.

The rim 32 is suitable for being associated with a tire 44, by the hermetic coupling of beads of the tire with the rim flanges 40.

The rim 32 comprises a lateral surface 46 which, together with the tire 44, delimits an inflation chamber 48 suitable for hermetically containing a gas under pressure so as to support the tire. It should be pointed out that the term "inflation chamber" is intended to define herein a substantially toroidal chamber suitable for containing a gas under pressure. This definition refers both to tubeless tires in which the inflation chamber is formed directly by the internal surface of the tire and by the rim, hermetically coupled with one another, and to conventional tires in which the inflation chamber is constituted by an inner tube interposed in the space between the tire and the rim.

The wheel 4 comprises at least one spoke 52 which fixes the rim 32 and the hub 8 together for rotation relative to the axle 6 of the wheel 4.

According to one embodiment, the spoke 52 extends substantially radially between the rim 32 and the hub 8, preferably so as to be arranged symmetrically with respect to the central plane R.

Moreover, the spoke 52 is a predominantly hollow element having thin walls which are connected to the hub 8 and to the rim 32.

In an axial direction, shown for example in FIG. 1, the spoke 52 has a trapezoidal overall shape with a width which decreases from the hub 8 towards the rim 32.

The spoke 52 comprises, at radially opposite ends, a hub-attachment portion 56 and a rim-attachment portion 60.

Figure 6:
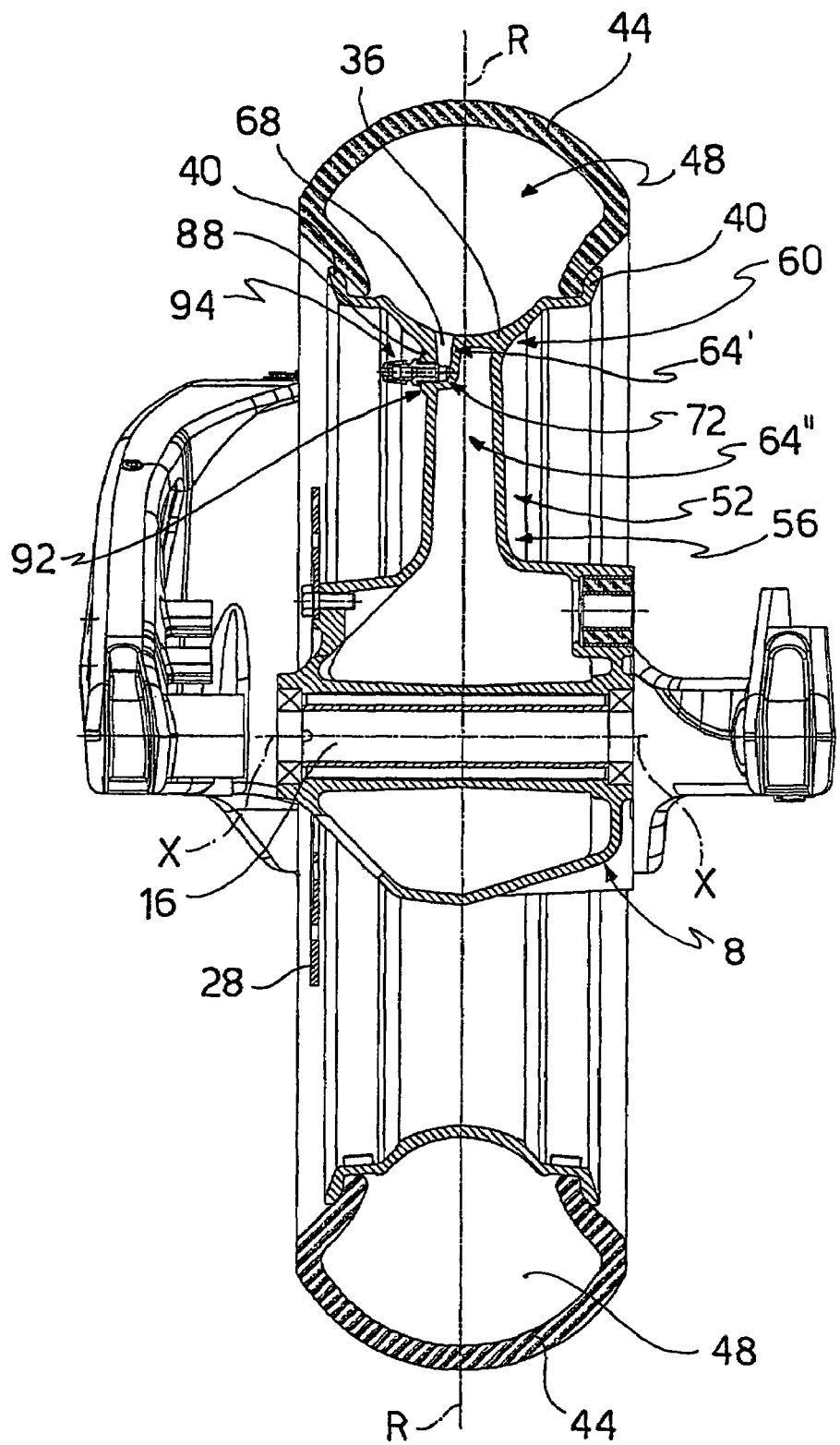
FIG. 6 is a section through the wheel of FIG. 5, taken on the line VI-VI of FIG. 5.

As shown in FIGS. 2 and 6, the hub-attachment portion 56 comprises a connecting portion between the hub 8 and the spoke 52.

Also, in FIG. 2, the rim-attachment portion 60 comprises at least one portion which constitutes a solid body 64; in other words, the spoke has a solid cross-section in the region of the solid body 64.

The solid body 64 is preferably positioned at the greatest possible radial distance from the hub. The solid body 64 constitutes a portion with a solid cross-section, that is a portion through which no gas-flow is permitted. In other words, the solid body separates the spoke into two portions 64' and 64" which are disposed on radially opposite sides of the solid body and are not in flow communication with one another.

Figure 3:
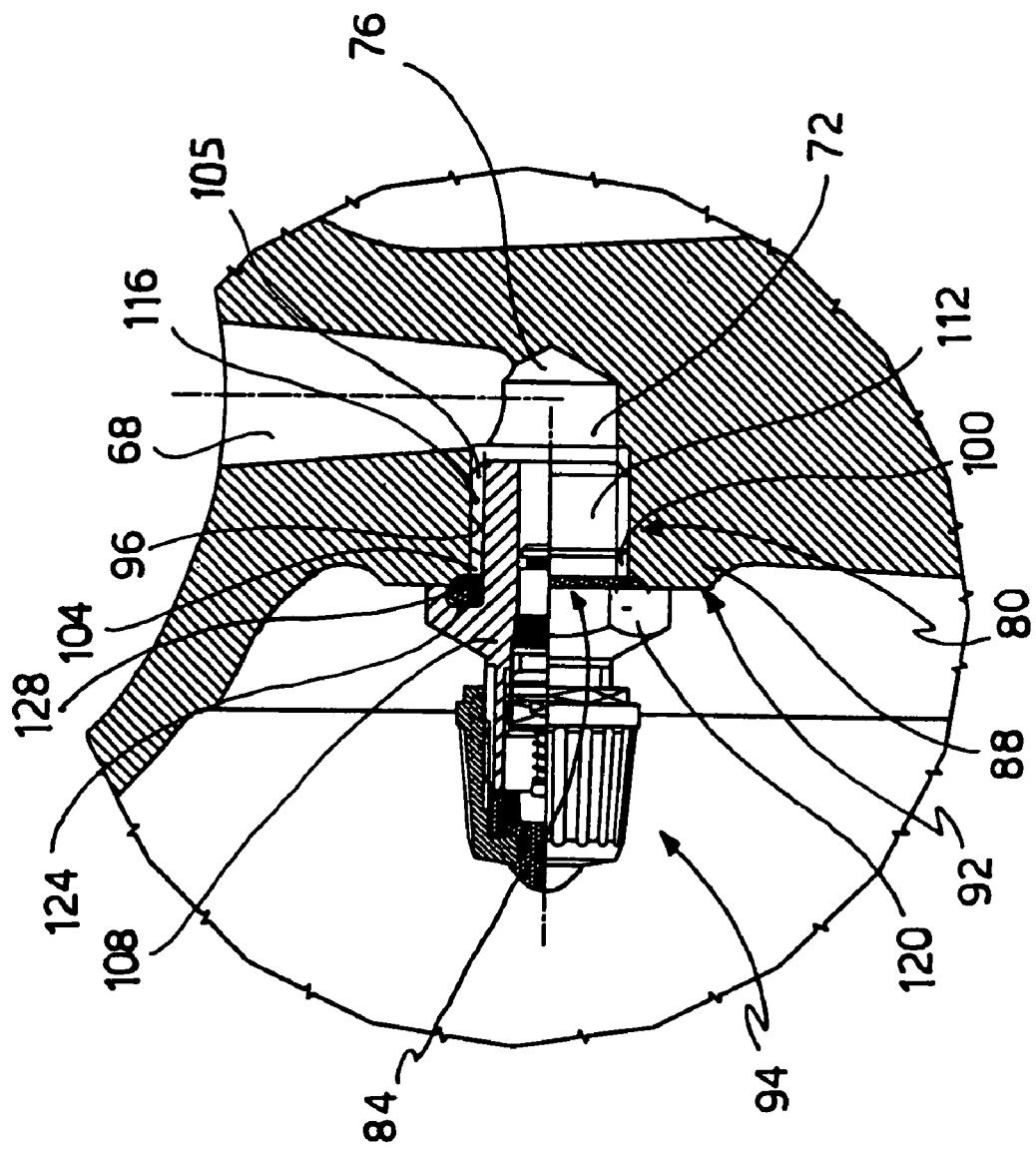
FIG. 3 shows a detail of FIG. 2 on an enlarged scale.
Figure 4:
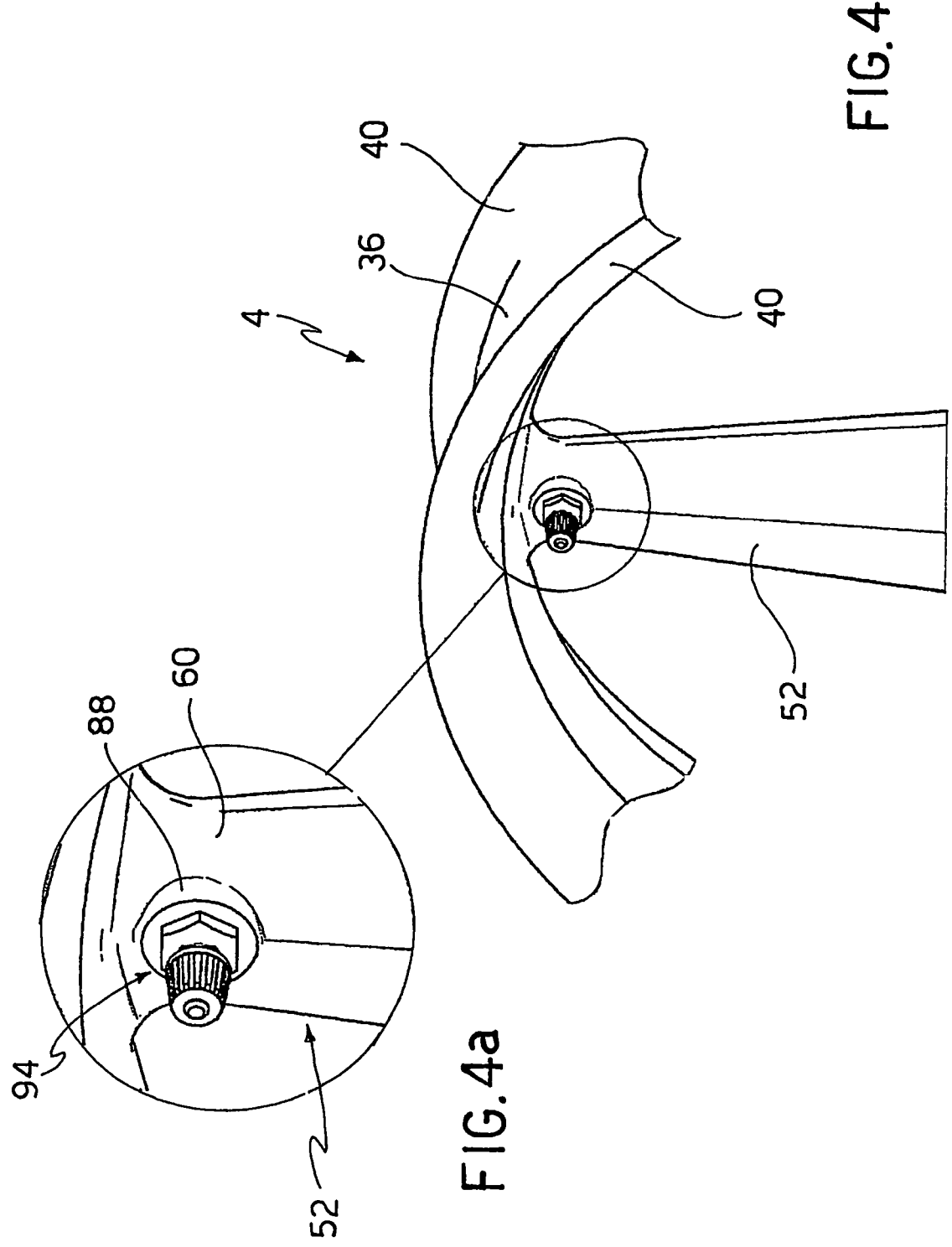
FIG. 4 is a perspective view of a portion of the wheel of FIG. 1.
Figure 5:
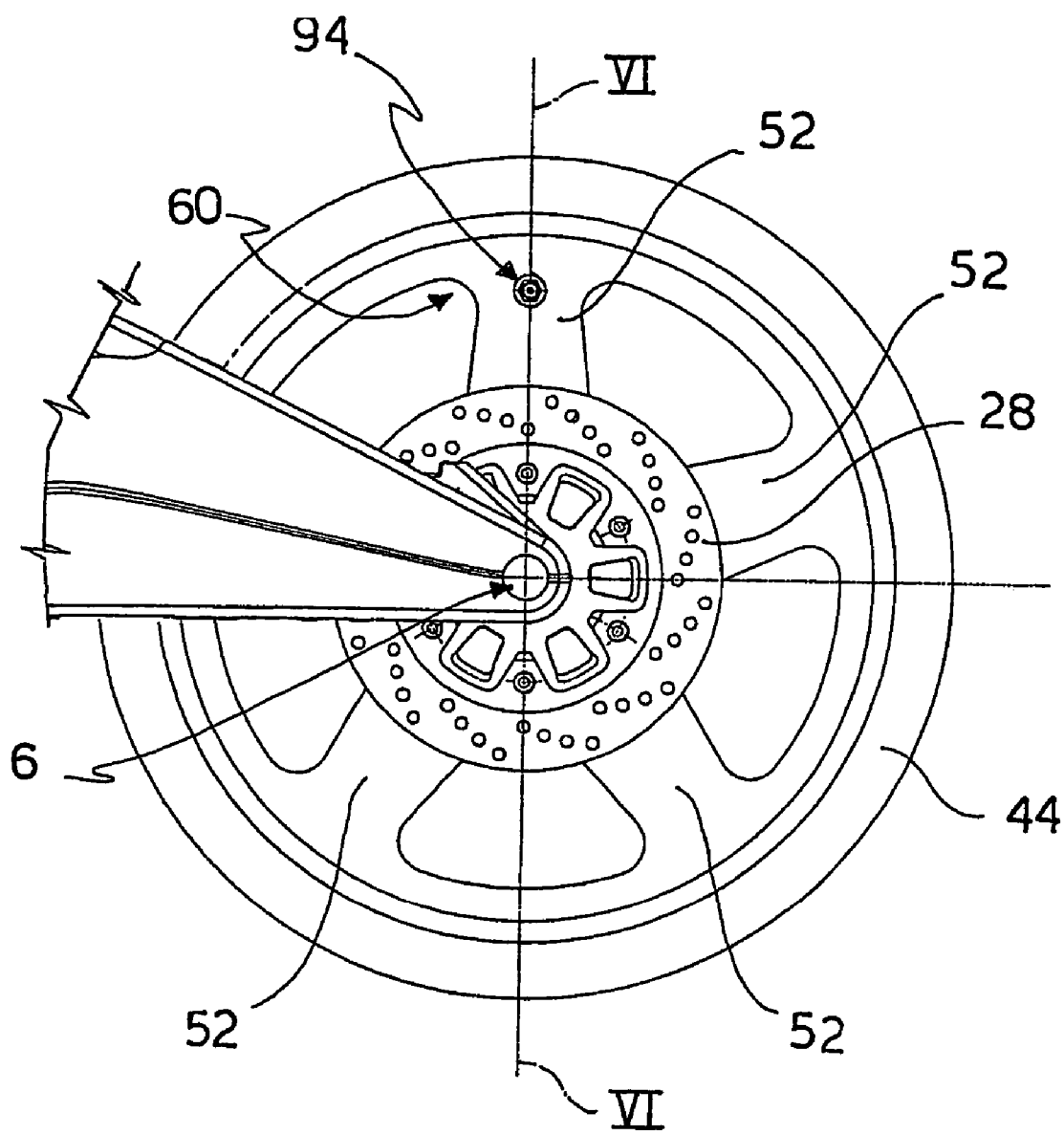
FIG. 5 is a side view of a further embodiment of the wheel according to the invention.

As shown in FIG. 3, a first duct 68 is formed in the region of the solid body 64 and extends substantially along the spoke 52, for example, radially; the first duct 68 faces the lateral surface 46 of the rim 32 and the inflation chamber 48 so as to be in flow communication with the inflation chamber 48.

The first duct 68 extends partially through the solid body 64, that is, it does not constitute a through-hole extending through the solid body 64, and does not therefore put the portions 64' and 64" of the spoke into flow communication. In other words, the first duct 68 is blind in the direction in which the spoke 52 extends, for example, in a radial direction towards the hub 8.

The solid body 64 further comprises a second duct 72 which, in one embodiment, is arranged substantially perpendicularly relative to the first duct 68 and to the central plane R.

In particular, the second duct 72 comprises a first end 76 facing towards the first duct 68 and in flow communication therewith, and a second end 80, remote from the first end 76 and having an opening 84 with which the second duct 72 emerges laterally from the spoke 52.

The opening 84 is suitable for being connected to inflation means such as, for example, a tire-inflation gauge nozzle.

The second duct 72 also extends partially through the solid body 64; that is, it does not constitute a through-hole extending through the solid body 64, but extends within the solid body as far as its intersection with the first duct 68.

The first and second ducts 68, 72 are thus in flow communication with one another and with the inflation chamber 48.

In other words, the first and second ducts constitute a path for the flow of gas from an external gas supply to the inflation chamber of the tire.

The first and second ducts 68, 72 advantageously extend for a distance less than an axial thickness or dimension of the rim-attachment portion 60 of the spoke 52.

According to one embodiment, shown in FIG. 3, the second duct 72 emerges, in the region of the second end 80, in a raised portion 88 which projects from the spoke 52, for example, in an axial direction, away from the central plane R. The raised portion 88 constitutes an axial thickening of the rim-attachment portion 60.

According to one embodiment, again as shown in FIG. 3, the raised portion 88 comprises a flattened surface 92 arranged substantially parallel to the central plane R and substantially perpendicular to the axle 6.

As shown in FIG. 2, the second duct 72 is advantageously positioned outside an axial projection of at least one brake disc that can be associated firmly and coaxially with the hub 8 at an axial end 20 of the hub 8. In other words, if the wheel is observed along the rotation axis X, the second duct 72 is positioned outside a circle having its centre on the rotation axis and touching the outer edge of the brake disc. In other words, the distance between the second duct and the rotation axis X is greater than the radius of the brake disc that can be associated with the wheel.

FIG. 3 displays how the second duct 72 advantageously constitutes a seat for housing an inflation valve 94. According to one embodiment, the second duct 72 has a threaded portion 100 in an internal side wall 96 thereof.

In the region of the opening 84, the second duct 72 has a chamber 104 for facilitating the insertion of threaded bodies into the second duct 72.

The inflation valve 94, which can be used to regulate the flow of a fluid through the first and second ducts 68, 72 and from these to the inflation chamber 48, is suitable for being housed at least partially in the second duct 72.

According to one embodiment, the inflation valve 94 comprises a substantially cylindrical valve body 108 having a connection portion 112 which has, on an external side wall, a threaded portion 116 suitable for screwing into the threaded portion 100 of the internal side wall 96 of the second duct 72.

In a substantially central portion, the valve body 108 comprises a collar 120 suitable for forming a stop element or abutment during the mounting of the valve 94 in the second duct 72, by coming into abutment with the flattened surface 92. According to one embodiment, the collar 120 is formed with a polygonal, preferably hexagonal, shape similar to a nut or screw head so that the valve can be gripped and screwed into its seat by a tool such as, for example, a socket spanner.

According to one embodiment, as shown in FIG. 3, the collar 120 comprises an annular groove 124 suitable for housing sealing means 128, for example, an O-ring-type sealing ring. The sealing means 128 is suitable for forming a fluid-tight seal between the inflation valve 94 and the second duct 72.

The threaded portion 116 preferably extends for a distance less than the depth of the second duct 72; in other words, the valve portion included between an end of the valve to be inserted in the seat and the collar 120 is shorter than the length of the second duct 72. When the valve is screwed into its seat, the sealing means 128 such as, for example, an O-ring housed in the annular groove 124, can therefore be suitably pre-loaded.

According to a further embodiment, the second duct, as shown in FIG. 3, may house a substantially cylindrical bushing 105 having a first thread on an external side wall and a second thread on its internal side wall. The bushing 105 can be screwed into the threaded portion 100 of the second duct 72 so as to be inserted in the duct. The threaded portion 100 preferably comprises a thread suitable for forming a self-tapping connection with the bushing 105. Moreover, the thread on the internal side wall of the bushing 105 is suitable for engaging a corresponding thread of a valve body 108 as described above.

The wheel described can, for example, be produced by a casting process in which the die is suitable for producing a spoke having, in a solid portion, a first duct which is arranged substantially radially and is produced, for example, by means of a pin or core which extends radially as far as the channel of the rim so that the first duct is in flow communication with the channel and hence with the inflation chamber of the tire that can be associated with the wheel. The die also comprises at least one further core suitable for forming the axial through-hole that extends through the hub and can house the wheel axle.

The die also enables a raised portion to be produced, projecting axially from at least one spoke. The raised portion stiffens the rim-attachment portion of the spoke, by virtue of the increase in its resisting cross-section and also enables a threaded portion long enough to ensure secure screwing and tightening of a valve to be formed inside the second duct.

After the wheel has been removed from the die, the axial drilling operations are performed. In particular, a precision drilling of the hub is performed so as to ensure adequate perpendicularity between the central plane of the rim and the hole in the hub as well as correct keying of support bearings between the hub and the axle; the second duct is also produced by means of a drilling operation performed in a substantially axial direction perpendicular to the raised portion of the spoke, so as to intersect the first duct.

During the production of the rim, both the axial ends of the hub and the raised portion are then flattened, the flattened surface of the raised portion being suitable for constituting a stop abutment for an inflation valve fixed in the second duct.

The second axial duct produced thus has an outer end comprising a flattened surface suitable for receiving an inflation valve in abutment and an inner end which is in flow communication with the first duct and, through the first duct, with the inflation chamber.

By virtue of the perpendicularity between the flattened surface and the axle, after the inflation valve has been mounted on the wheel, the valve is positioned axially and perpendicularly relative to the flattened surface; dynamic imbalances of the wheel are thus limited and the fitting of the air-supply hose on the valve is facilitated.

The flattened surface of the raised portion also constitutes a bearing surface for sealing means such as, for example, an O-ring to be interposed between the inflation valve and the second duct. The flatness of the flattened surface is useful for ensuring correct deformation of the ring as a result of the screwing of the valve into its seat and hence a resulting hermetic seal thereof between the surfaces of the valve and of the spoke, between which it is inserted.

As can be appreciated from the foregoing description, the wheel described overcomes the problems affecting wheels of the prior art.

In particular, the wheel described is especially advantageous when mounted on motorcycles.

In accordance with aesthetic requirements relating particularly to the motorcycling field, the wheel described can advantageously also be produced with spokes of complex and curved geometrical shapes.

Moreover, with the wheel described, the operation to inflate the respective tire is considerably simplified. In fact, it suffices to bring the gauge nozzle axially up to the valve, which is easily accessible in the vicinity of the rim-attachment region of the spoke, since the valve is positioned outside the space occupied by the discs, the chain wheel, and the casings.

Moreover, since the hose of the nozzle does not have to be bent it is possible to perform the inflation with one hand alone, without leakages of air taking place between the nozzle and the valve stem.

Furthermore, in the wheel described, the machining of the valve seat takes place in a direction substantially parallel to the wheel axle as well as to the holes for the fixing of the hub to the axle. All of the parallel holes can thus be machined without the need to perform a suitable re-gripping step for the machining of the valve seat.

As a further advantage, in the wheel described, the volume of air contained in the first and second ducts is extremely small. Variations in pressure inside the inflation chamber of the tire in dependence on temperature are thus limited since the amount of gas outside the inflation chamber is extremely small.

Moreover, the wheel described can be made of light or ultra-light alloy of any type so as to limit mass and gyroscopic effects. Moreover, the bushing 105 interposed between the valve and the second duct prevents corrosion of the valve seat by preventing direct contact between the material of the rim and the material of the valve. Furthermore, for particularly ductile light alloys which are unsuitable for being machined in order to produce the fine-pitch threads that are typical of inflation valves, it is possible to interpose a bushing having a long-pitch thread, for example, of the self-tapping type at the interface between the seat and the bushing, and a fine-pitch thread at the interface between the bushing and the valve.

Moreover, in the wheel described, the inflation valve can easily be fitted from the exterior since it can be screwed directly into its seat, avoiding the need to insert the valve through a wall of the rim and then fix it with a nut from the opposite and inner side of the rim.

In order to satisfy contingent and specific requirements, a person skilled in the art may apply many modifications and variations to the wheels described above.

For example, it is possible to produce spokes having curved shapes, that is, spokes which do not extend linearly along a radius of the rim. Moreover, it is possible to produce spokes that are arranged in non-symmetrical positions with respect to the central plane R.

However, these and other embodiments are all included within the scope of the invention as defined by the appended claims.

The invention claimed is:

1. A vehicle wheel comprising a hub suitable for being mounted rotatably on an axle of the wheel, the axle extending in an axial direction, a rim suitable for being mounted with a tire, the rim having a lateral surface delineating, together with the tire, an inflation chamber for the tire, at least one spoke which fixes the rim and the hub together for rotation relative to the axle of the wheel, the spoke comprising a hub-attachment portion, a rim-attachment portion, and a solid body in which there are formed a first duct which extends substantially along an axis of the spoke and is in flow communication with the inflation chamber through the lateral surface of the rim, and a second duct which is arranged substantially perpendicularly relative to the first duct so that, in the region of a first end of the second duct which faces towards the first duct, the second duct intersects the first duct so as to create a flow communication between the first duct and the second duct and, in the region of a second end remote from the first end, the second duct emerges laterally from the at least one spoke with an opening, the opening being suitable for connection to inflation means, wherein said solid body separates the spoke into two portions which are disposed on radially opposite sides of the solid body, at least one section of the rim-attachment portion constitutes said solid body and said first duct extends partially through the solid body, does not constitute a through-hold extending through the solid body, and does not put the two portions of the spoke into flow communication with each other, so that variations in pressure inside the inflation chamber of the tire in dependence on temperature are limited, since the amount of gas outside the inflation chamber is small.

2. A vehicle wheel according to claim 1, comprising a central plane arranged perpendicularly relative to the axle of the wheel, the central plane dividing the wheel into two half-portions arranged symmetrically on opposite sides of the central plane.

3. A vehicle wheel according to claim 1, in which the second duct emerges, in the region of the second end, in a raised portion which projects from the at least one spoke.

4. A vehicle wheel according to claim 3, in which the raised portion comprises a flattened surface at a free end of the raised portion.

5. A vehicle wheel according to claim 4, in which the flattened surface constitutes an abutment for an inflation valve.

6. A vehicle wheel according to claim 4, in which the flattened surface constitutes an abutment for sealing means, the sealing means being interposed between the second duct and an inflation valve.

7. A vehicle wheel according to claim 1, in which the first and second ducts extend for a distance shorter than the rim-attachment portion of the at least one spoke.

8. A vehicle wheel according to claim 1, in which the second duct constitutes a seat suitable for housing an inflation valve.

9. A vehicle wheel according to claim 8, in which the second duct comprises, in an internal side wall thereof, a threaded portion suitable for forming a threaded connection with a corresponding threaded portion of a valve body of an inflation valve.

10. A vehicle wheel according to claim 1, in which the first duct extends substantially radially.

11. A vehicle wheel according to claim 1, in which the first duct extends substantially symmetrically with respect to the central plane.

12. A vehicle wheel according to claim 1, in which the second duct extends substantially perpendicularly relative to the central plane of the wheel.

13. A vehicle wheel according to claim 1, in which the distance between the second duct and the rotation axis is greater than the radius of at least one brake disc mounted firmly and coaxially on the hub in the region of an axial end of the hub.

14. A vehicle wheel according to claim 1, in which the wheel comprises a bushing suitable for being housed in the second duct and suitable for housing in its interior a valve body of an inflation valve.

15. A vehicle wheel according to claim 14 in which the bushing is made of brass.

16. A vehicle wheel according to claim 14 in which the bushing is made of an aluminium alloy.

17. A vehicle wheel according to claim 1, in which the wheel is made of an aluminium alloy.

18. A vehicle wheel according to claim 1, in which the wheel is made of a magnesium alloy.

19. A vehicle wheel according to claim 1, comprising an inflation valve suitable for being fitted in the second duct so as to constitute a means for the inflation of a tire that can be associated with the wheel.

20. A vehicle wheel according to claim 1, in which the first duct is blind in the direction in which the at least one spoke extends.

21. A method for the manufacture of a wheel according to claim 1, comprising the steps of:
   producing, by means of a casting process, a rim having a spoke comprising, in the region of a solid body, a first duct extending radially, and a raised portion extending axially,
   drilling the spoke axially in the region of the raised portion so as to produce a second duct which intersects the first duct, and
   flattening the raised portion in a plane perpendicular to the axle.

22. A method for the manufacture of a wheel according to claim 21, in which the first duct is blind in the direction in which the spoke extends.

23. A method for the manufacture of a wheel according to claim 21, comprising the step of forming a thread in the internal side wall of the second duct.

* * * * *